United States Patent [19]
Hawn

[11] Patent Number: 6,012,381
[45] Date of Patent: Jan. 11, 2000

[54] CONVECTION MEAT COOKER

[76] Inventor: Clifford W. Hawn, 109 Peterson Dr., Benton, La. 71006

[21] Appl. No.: 09/346,662

[22] Filed: Jul. 1, 1999

[51] Int. Cl.[7] .............................. A47J 37/00; A47J 37/04; A47J 37/07
[52] U.S. Cl. ................................ 99/340; 99/355; 99/446; 99/450; 99/482; 99/472; 99/470; 126/25 R; 126/9 R
[58] Field of Search ............................... 99/330, 339, 340, 99/352–355, 400, 401, 444–446, 447, 448, 449, 450, 482, 470, 467, 472, 483; 162/21, 53; 34/407, 73; 126/25 R, 9 R, 275 R; 426/465, 423, 281, 314, 315

[56] References Cited

U.S. PATENT DOCUMENTS

| | | | |
|---|---|---|---|
| 1,793,711 | 2/1931 | Mitscherling . | |
| 3,559,564 | 2/1971 | Turner et al. | 99/332 |
| 3,615,599 | 10/1971 | Skamoto | 99/140 |
| 3,709,142 | 1/1973 | Peterson | 99/470 X |
| 3,713,846 | 1/1973 | Turner et al. | 99/340 X |
| 3,718,485 | 2/1973 | Lankford | 99/472 X |
| 3,769,902 | 11/1973 | Hurwitz | 99/472 |
| 4,321,863 | 3/1982 | Dimov | 99/470 |
| 4,326,341 | 4/1982 | Anderson | 34/27 |
| 4,968,516 | 11/1990 | Thompson | 426/523 X |
| 5,097,759 | 3/1992 | Vilgrain et al. | 99/483 X |
| 5,123,337 | 6/1992 | Vilgrain et al. | 99/340 X |
| 5,347,918 | 9/1994 | Chen | 99/472 |
| 5,368,872 | 11/1994 | David | 426/281 |
| 5,575,198 | 11/1996 | Lowery | 99/446 X |
| 5,741,536 | 4/1998 | Mauer et al. | 426/281 X |
| 5,767,487 | 6/1998 | Tippmann | 99/472 X |
| 5,768,983 | 6/1998 | Treiber | 99/482 |

*Primary Examiner*—Timothy Simone
*Attorney, Agent, or Firm*—John M. Harrison

[57] ABSTRACT

A convection meat cooker characterized by an elongated, cylindrical cooker tank which, in a preferred embodiment, is provided on a portable cooker frame and includes concentric outer, middle and inner shells. The inner shell defines an interior cooking chamber which is hermetically sealed by a door hinged to the outer shell at one end of the cooker tank and a cylindrical, annular heat chamber is defined between the middle and inner shells throughout the length of the cooker tank. Insulation is typically provided between the middle and outer shells of the cooker tank. A heat entrance port extends from the middle shell and receives a propane-fueled burner for heating the cylindrical heat chamber and a heat exit port vents excess heat from the annular heat chamber. An open water container may be removably attached to the cooker frame and pressure vent piping provided in fluid communication with the cooking chamber is immersed in water provided in the water container. In operation, as the annular heat chamber is heated by the burner, heat is uniformly produced throughout the sealed cooking chamber by convection from in the annular heat chamber and causes meat in the cooking chamber to cook quickly, in a partial vacuum, minimizing loss of natural moisture from the meat. After the cooked meat is removed from the cooking chamber, the burner extinguished and the cooking chamber re-sealed, the cooling, contracting air in the cooking chamber creates a partial vacuum which draws moisture from the water container into the cooking chamber, moisturizing and cooling the cooking chamber interior.

29 Claims, 4 Drawing Sheets

CONVECTION MEAT COOKER

BACKGROUND OF THE INVENTION

Field of the Invention

This invention relates to cookers for roasting, broiling, smoking or barbecuing meats and more particularly, to a convection meat cooker which uses convection heat to achieve a uniformly heated, high temperature, negative pressure cooking chamber and drastically reduces the time required for roasting, broiling, smoking or barbecuing meats, in such a manner that most of the natural moisture and tenderness is retained in the meat as the meat is cooked. In a preferred embodiment the convection meat cooker is characterized by an elongated, cylindrical cooker tank which, in a preferred embodiment, is horizontally mounted on a portable cooker frame. The cooker tank is constructed from concentric outer, middle and inner shells, the inner shell defining an interior cooking chamber which may be hermetically sealed by a door hinged to the outer shell at one end of the cooker tank. A cylindrical, annular heat chamber is defined between the middle and inner shells throughout the length of the cooker tank, and surrounds the cooking chamber and insulation is typically provided between the middle and outer shells of the cooker tank. A heat entrance port extends outwardly from the middle shell through the insulation and outer shell of the cooker tank and receives a typically propane-fueled burner for directly heating the annular heat chamber, and the cooking chamber is heated by convection from in the annular heat chamber. A heat exit port similarly extends from the middle shell of the cooker tank and vents excess heat from the annular heat chamber and in an alternative embodiment, a damper is provided in the heat exit port to facilitate regulating flow of heat from the annular heat chamber. In a preferred embodiment an open water container is removably attached to the cooker frame and pressure vent piping, provided in fluid communication with the cooking chamber, terminates in a cylindrical pressure vent, the open bottom end of which is immersed in water provided in the water container.

In operation of the convection meat cooker, the meat is initially placed on a meat rack provided in the cooking chamber of the cooker tank and the door is closed and latched to hermetically seal the cooking chamber. As the annular heat chamber is heated by operation of the burner, intense heat is uniformly produced throughout the cooking chamber by convection from in the annular heat chamber, causing a partial vacuum in the cooking chamber and allowing the meat to cook quickly and thus minimizing loss of natural moisture and tenderness from the meat. Excess pressure is vented from reduced in the air-tight cooking chamber through the pressure vent piping, pressure vent and water container, as the cooking chamber is heated. After the cooked meat is removed from the cooking chamber, the burner turned off and the cooking chamber again sealed, the cooling, contracting air in the cooking chamber creates a second partial vacuum which draws moisture from the water container into the cooking chamber, thus cooling and moisturizing the cooking chamber to facilitate wiping and cleaning the cooking chamber interior. A wood holder bracket is typically provided in the cooking chamber above the burner for holding wood or charcoal and smoking the meat, as desired.

Meats such as turkey, ham, roast and chicken are frequently cooked in outdoor grills or smokers to provide a distinct flavor to the meat which cannot be achieved by cooking the meat in an indoor oven or grill. Conventional grills or smokers are typically characterized by a pit in the bottom of the grill or smoker for receiving wood chips or charcoal, gas jets which produce a gas or propane-fueled flame beneath the wood or charcoal and a grill located above the wood or charcoal. These cookers can typically be closed by a lid while the meat is cooking to form a cooking chamber in which smoke and heat from the wood or charcoal is trapped. The cooking chamber is typically not air-tight when closed, however, and this allows escape of some heat from the cooking chamber. Consequently, cooking various kinds of meat can require an inordinately long period of time. Furthermore, the heat is typically not uniformly distributed throughout the cooking chamber, since the heat is applied to the cooking chamber beneath the meat only, and does not surround the meat. This deficiency frequently renders it necessary to open the grill or smoker and change the position of the meat several times during cooking, causing further loss of heat from the cooking chamber.

Description of the Prior Art

Many different types of devices have been designed which utilize a sealed chamber for cooking, processing or maintaining the temperature of cooked foods. One such device is described in U.S. Pat. No. 3,615,599, entitled "Method of and Apparatus for Processing Garlic", dated Oct. 26, 1971, to Yoshizo Sakamoto. According to the disclosed method, garlic is heated and agitated in a closed chamber to facilitate uniform heating under nonoxidizing conditions and obtain the solid and volatile components of the garlic. The volatile component of the garlic is removed from the chamber and separated into liquid and gaseous fractions. As the liquid fraction of the garlic is collected, dust is removed from the gaseous fraction and collected. A "Fruit and Vegetable Processing Apparatus" for continually processing produce such as fruits and vegetables, is detailed in U.S. Pat. No. 4,321,863, dated Mar. 30, 1982, to Peter S. Dimov, et al. The produce is heated by being fed into a pipe coil immersed in hot water and is drawn from the coil by vacuum pressure into an expansion chamber, where the produce is subjected to cold water. The produce is drawn from the expansion chamber with the cold water and then separated from the water. A "Drying Method and Apparatus for Drying Prunes, Fish, Brewers Grain, Shelled Corn, and the Like" which is accomplished by use of a vacuum tank, is disclosed in U.S. Pat. No. 4,326,341, dated Apr. 27, 1982, to Max F. Anderson. The vacuum tank is initially partially filled with cold liquid such as water, and the material to be dried is supported in the tank above the liquid surface. A surface condensing mechanism is located inside the tank adjacent to the tank bottom in the cold liquid and includes a combined vapor inlet-liquid overflow conduit, through which vapor which evaporates from the material to be dried enters and through which liquid in the tank may overflow. Air is evacuated from the tank by first filling the tank with liquid while venting air therefrom, and then pumping the liquid from the tank through the condensing mechanism. Moisture which rapidly evaporates from the material to be dried is condensed at the surface of the cold liquid in the condensing mechanism, and then pumped from the condensing mechanism. U.S. Pat. No. 5,347,918, dated Sep. 20, 1994, to Po-Hung Chen, describes a "Vacuum Thermal Cooker", including an outer cooker, an inner cooker and a sealing lid, which inner cooker is initially used for boiling food and is then placed inside the outer cooker, which is sealed by the sealing lid. The air is then drawn from the outer cooker, creating a vacuum between the outer and inner cookers, such that the food in the inner cooker cannot be cooled by convection of the outside air and can remain heated for a long period of time. U.S. Pat. No. 5,368,872, dated Nov. 29, 1994, to Don M. Davis, Jr., discloses a "Pressure and Vacuum Smoker Apparatus and Method", which apparatus includes separate compartments for maintaining a fire for pressurized smoking of foods and smoking of foods in a partial vacuum. A fire is created in the fire compartment and the food to be smoked is placed in the other compartments. The design of the device enables a user to pressurize the fire compartment with air and to transfer the pressurized and smoke-filled air to the pressure smoking compartment and smoke the foods contained under pressure therein. The design further allows a user to create a partial vacuum in the vacuum smoking compartment, to draw smoke filled air from the fire compartment into the vacuum smoking compartment and to maintain a partial vacuum in the vacuum smoking compartment. Accordingly, the temperature, smoke concentration and pressure in the pressure and vacuum smoking compartments can be regulated. A "High Temperature Wood Smoker" is described in U.S. Pat. No. 5,768,983, dated Jun. 23, 1998, to Rodney Treiber. The smoker includes an outer cooking container for receiving wood chips, an inner cooking container for receiving the food to be smoked and a cover for the inner cooking container. The wood chips are ignited in the bottom of the outer cooking container and produce smoke, which flows through apertures provided in the bottom of the inner cooking container, and the ignited wood chips further provide cooking heat for the food provided in the inner cooking container.

An object of this invention is to provide a convection-type, partial vacuum meat cooker which reduces the time required for cooking food, particularly meat, as compared to conventional meat cookers and smokers.

Another object of this invention is to provide a convection-type meat cooker which uses convection heat to achieve a uniformly heated, high temperature cooking chamber having a partial vacuum, that drastically reduces the time required for cooking meat in such a manner that most of the natural moisture and tenderness is retained in the meat as the meat is cooked.

Still another object of this invention is to provide a self-moisturizing and self-cooling, negative pressure convection meat cooker which uses convection heat to quickly roast, broil, smoke or barbecue meats.

Yet another object of this invention is to provide a convection meat cooker which is provided on a portable frame.

A still further object of this invention is to provide a convection meat cooker characterized by an elongated, cylindrical cooker tank provided on a portable tank frame and including concentric outer and inner shells, the inner shell defining an interior, air sealable cooking chamber; a cylindrical, annular heat chamber defined between the inner and outer shells throughout the length of the cooker tank in surrounding relationship to the cooking chamber; and a burner engaging the cooker tank for directly heating the annular heat chamber, such that the cooking chamber is substantially uniformly heated throughout by convection from the surrounding annular heat chamber during operation of the burner.

Another object of this invention is to provide a convection meat cooker characterized by an elongated, cylindrical cooker tank provided on a portable tank frame and including concentric outer, middle and inner shells, the inner shell defining an interior, hermetically sealable cooking chamber; a cylindrical, annular heat chamber defined between the middle and inner shells throughout the length of the cooker tank in surrounding relationship to the cooking chamber; insulation provided between the middle and outer shells of the cooker tank; and a burner engaging the cooker tank for directly heating the annular heat chamber, such that the cooking chamber is substantially uniformly heated throughout by convection from the annular heat chamber; and a water container provided in fluid communication with the cooking chamber of the cooker tank, such that a first partial vacuum is maintained in the cooking chamber and after the burner is turned off, the food is removed from the cooking chamber and the cooking chamber is re-sealed, the cooling, contracting air creates a second partial vacuum in the sealed cooking chamber, which draws moisture from the water container into the cooking chamber, thus cooling and moisturizing the cooking chamber to facilitate wiping and cleaning the cooking chamber interior.

SUMMARY OF THE INVENTION

These and other objects of the invention are provided in a convection meat cooker characterized by an elongated, cylindrical cooker tank which, in a preferred embodiment, is mounted horizontally on a portable cooker frame. The cooker tank is constructed from concentric steel outer, middle and inner shells, the inner shell defining an interior cooking chamber which is hermetically sealed by a door hinged to the outer shell at one end of the cooker tank. A cylindrical, annular heat chamber is defined between the middle and inner shells throughout the length of the cooker tank in surrounding relationship to the cooking chamber and insulation is typically provided between the middle and outer shells of the cooker tank. A heat entrance port extends outwardly from the middle shell, through the insulation and outer shell of the cooker tank and receives a typically propane-fueled burner for directly heating the annular heat chamber and the cooking chamber is uniformly heated throughout by convection from the annular heat chamber. A heat exit port similarly extends from the middle shell of the cooker tank and vents excess heat from the annular heat chamber and the heat exit port may contain a damper to facilitate regulating loss of heat from the annular heat chamber. In a preferred embodiment an open water container is removably attached to the cooker frame and pressure vent piping provided in fluid communication with the cooking chamber terminates in a cylindrical pressure vent, the open bottom end of which is immersed in water provided in the water container to create a partial vacuum in the cooking chamber as the food cooks.

In operation of the convection meat cooker, the meat is initially placed on a meat rack provided in the cooking chamber of the cooker tank, and the door closed and latched to seal the cooking chamber. As the annular heat chamber is heated by operation of the burner, intense heat is uniformly produced throughout the cooking chamber by convection from the surrounding annular heat chamber and a partial vacuum is formed in the cooking chamber, causing the meat to cook quickly and thus minimizing loss of natural moisture and tenderness from the meat. Excess pressure is vented from the heated, sealed cooking chamber through the pressure vent piping, pressure vent and water container. After the cooked meat is removed from the cooking chamber, the burner turned off and the cooking chamber closed, the cooling, contracting air in the cooking chamber creates a second partial vacuum which draws moisture from the water container into the cooking chamber, cooling and moisturizing the cooking chamber to facilitate wiping and cleaning the cooking chamber interior. A wood holder bracket is typically provided in the cooking chamber above the burner for holding wood or charcoal, to facilitate smoking the meat, as desired.

BRIEF DESCRIPTION OF THE DRAWINGS

The invention will be better understood by reference to the accompanying drawings, wherein.

DESCRIPTION OF THE PREFERRED EMBODIMENTS

Figure 1:
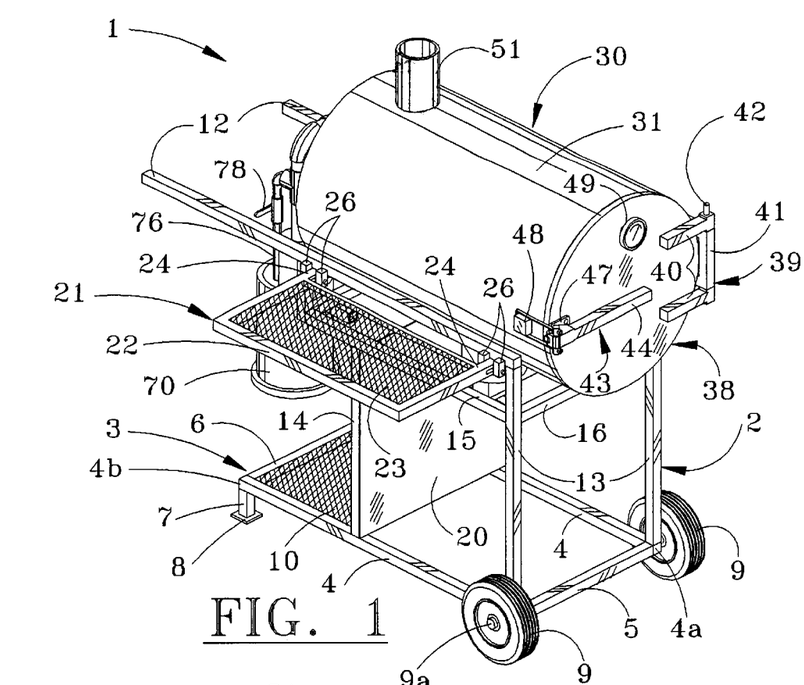
FIG. 1 is a perspective view of a preferred embodiment of the convection meat cooker of this invention, with a folding support shelf provided on the cooker frame component and illustrated in extended, supporting configuration.
Figure 2:
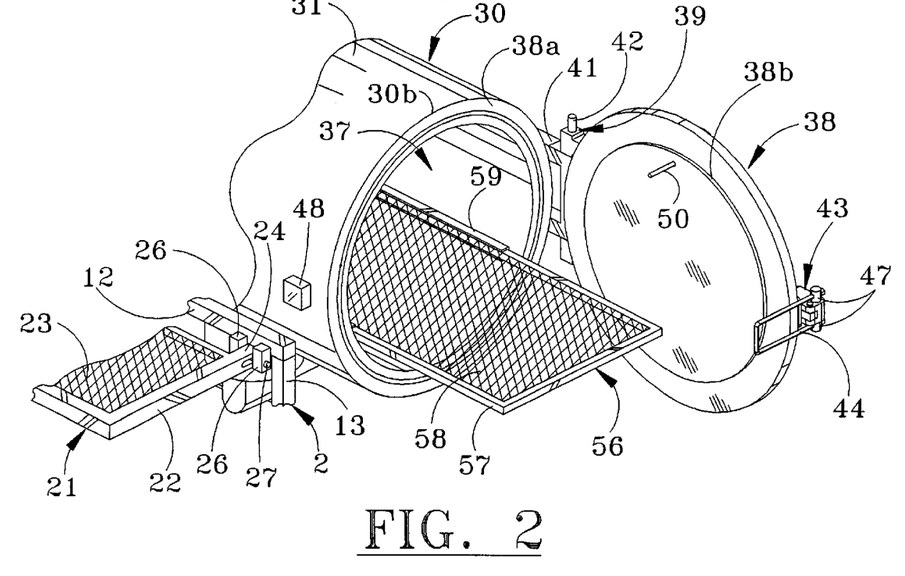
FIG. 2 is a front perspective view, partially in section, of the cooker tank component of the convection meat cooker, with the tank door in the open configuration and a meat rack partially extended from the cooking chamber of the cooker tank interior.
Figure 3:
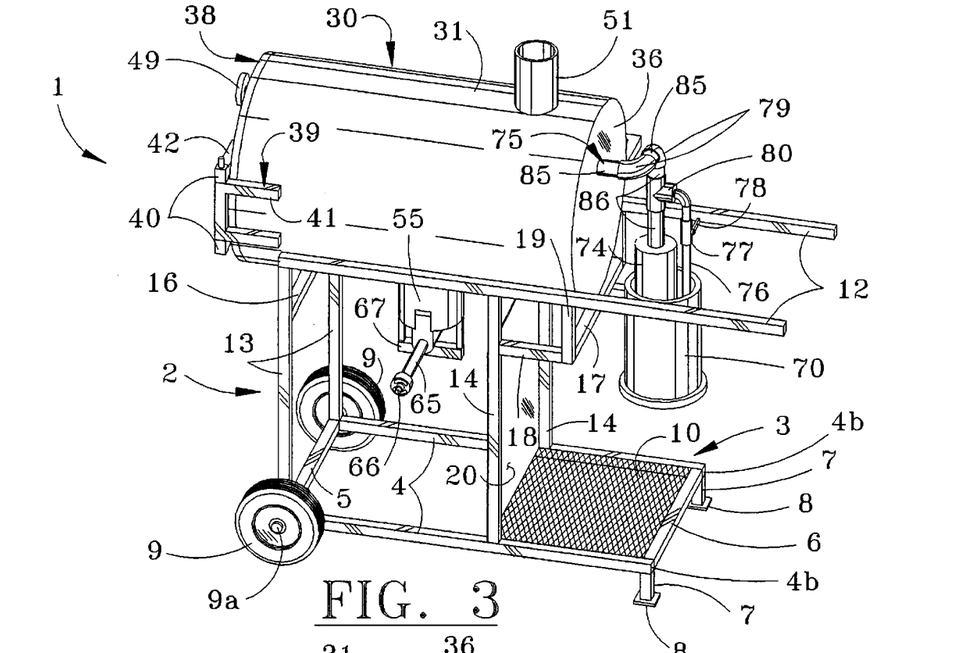
FIG. 3 is a perspective view of a preferred embodiment of the convection meat cooker, illustrating the typical pressure vent piping, pressure vent and water container components at the rear end of the cooker tank.

Referring initially to FIGS. 1–3 and 5 of the drawings, in a preferred embodiment the convection meat cooker of this invention is generally illustrated by reference numeral 1. The convection meat cooker 1 includes a portable cooker frame 2, typically constructed from aluminum or steel square tubing and characterized by a rectangular wheel frame 3, having pair of spaced, parallel side frame members 4, spanned by a front frame member 5 at the front ends 4*a* and a rear frame member 6 at the rear ends 4*b* of the respective side frame members 4, as particularly illustrated in FIG. 1. A frame leg 7 extends downwardly from each side frame member 4 at each end of the rear frame member 6, and a square frame foot 8 terminates the bottom end of each frame leg 7, for resting the cooker frame 2 on a supporting surface (not illustrated). As further illustrated in FIGS. 1 and 3, frame wheels 9 are journalled for rotation on respective wheel axles 9*a*, which extend from the side frame members 4 at the respective ends of the front frame member 5 for imparting mobility to the cooker frame 2 on a supporting surface, as hereinafter described. As illustrated in FIG. 3, front handle supports 13 extend vertically from the side frame members 4 at respective ends of the front frame member 5 and rear handle supports 14 extend vertically from the respective side frame members 4, typically near the midpoint of each side frame member 4. A handle support panel 20 typically spans the rear handle supports 14 and a frame mesh 10 is supported between the rear frame member 6, side frame members 4 and handle support panel 20, as illustrated in FIG. 3, for supporting a burner fuel tank 63 (illustrated in phantom in FIG. 8) as hereinafter further described. A horizontal front tank support bar 16, the purpose of which will be hereinafter further described, spans the vertical front handle supports 13 above the front frame member 5. A horizontal tank support brace 18 extends rearwardly from each rear handle support 14 and a vertical tank support brace 19 extends upwardly from the extending rear end of each horizontal tank support brace 18. A horizontal rear tank support bar 17, the purpose of which will be hereinafter further described, spans the vertical tank support braces 19.

As further illustrated in FIG. 1, a shelf brace 15, the purpose of which will be hereinafter further described, spans the front handle support 13 and rear handle support 14 on one side of the cooker frame 2, above the corresponding side frame member 4. An elongated frame handle 12 is supported on the upper end of each front handle support 13, rear handle support 14 and vertical tank support brace 19 on each side of the cooker frame 2 and each frame handle 12 extends rearwardly, typically beyond the rear frame member 6 of the rectangular wheel frame 3, as illustrated in FIG. 3. As hereinafter further described, transportation of the cooker frame 2 on the frame wheels 9 may be accomplished by lifting the frame feet 8 (provided on the frame legs 7) from the supporting surface (not illustrated) by lifting upwardly on the frame handles 12, and pulling or pushing on the frame handles 12.

Figures 5, 6, 7:
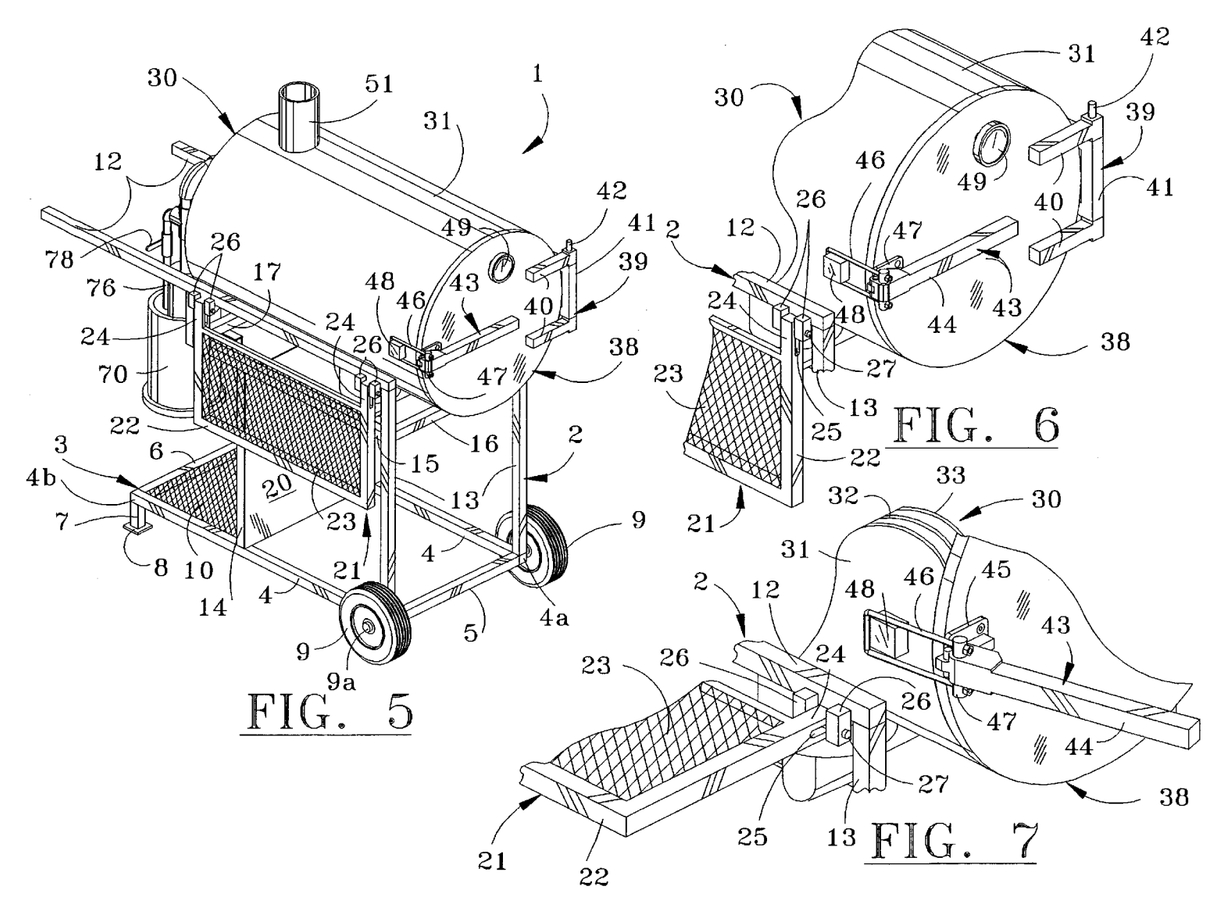
FIG. 5 is a perspective view of the convection meat cooker, with the folding support shelf component of the cooker frame illustrated in the lowered, non-supporting position.
FIG. 6 is a front perspective view, partially in section, of the cooker tank component of the convection meat cooker, more particularly illustrating a preferred latch for removably securing the tank door against the cooker tank and sealing the cooking chamber, with the door latch pivoted to the locked position on the tank door.
FIG. 7 is a front perspective view, partially in section, of the cooker tank component of the convection meat cooker illustrated in FIG. 6, with the door latch pivoted to the unlocked position on the tank door.

Referring again to FIGS. 1 and 5 and to FIGS. 6 and 7 of the drawings, in a preferred embodiment a folding support shelf 21 is provided on the cooker frame 2 for supporting a baste bowl, seasonings, meat and the like, during operation of the convection meat cooker 1, as hereinafter described. The support shelf 21 is characterized by a rectangular, typically square tubing support shelf frame 22 which supports a spanning shelf mesh 23. As illustrated in FIG. 5, a pair of spaced-apart hinge frame extensions 24 extends from the support shelf frame 22 and elongated, registering hinge slots 25 are provided in the respective sides of each hinge frame extension 24, as particularly illustrated in FIGS. 6 and 7, for purposes which will be hereinafter further described. As further illustrated in FIG. 1, two pairs of adjacent, spaced-apart hinge blocks 26 are typically welded to the frame handle 12, which is located above the shelf brace 15, as illustrated in FIG. 1, in spaced-apart relationship with respect to each other. Each hinge frame extension 24 of the support shelf frame 22 is inserted between the hinge blocks 26 of the corresponding hinge block 26 pair. As illustrated in FIGS. 6 and 7, a hinge pin 27 extends through aligned pin openings (not illustrated) provided in the hinge blocks 26 of each pair and through the registering hinge slots 25 provided in the respective sides of the corresponding hinge frame extension 24, to pivotally mount the support shelf 21 on the frame handle 12. Accordingly, the support shelf 21 can be pivoted from the vertical, non-supporting position in which the support shelf rests against the shelf brace 15, as illustrated in FIG. 5, to the horizontal, supporting configuration illustrated in FIGS. 1 and 7, as desired, by lifting the support shelf 21 upwardly on the respective hinge pins 27 to the horizontal configuration and then pushing the horizontal support shelf 21 toward the frame handle 12, with the hinge pins 27 traversing the respective hinge slots 25, to insert the respective hinge frame extensions 24 beneath the frame handle 12, as illustrated in FIG. 7, and thus prevent the support shelf 21 from dropping to the vertical position. The support shelf 21 is returned to the vertical, non-supporting position and rested against the shelf brace 15 when not in use, by pulling the deployed support shelf 21 in the direction away from the frame handle 12, thus clearing the respective hinge frame extensions 24 from the frame handle 12 and then lowering the support shelf 21 to the vertical position.

Figure 8:
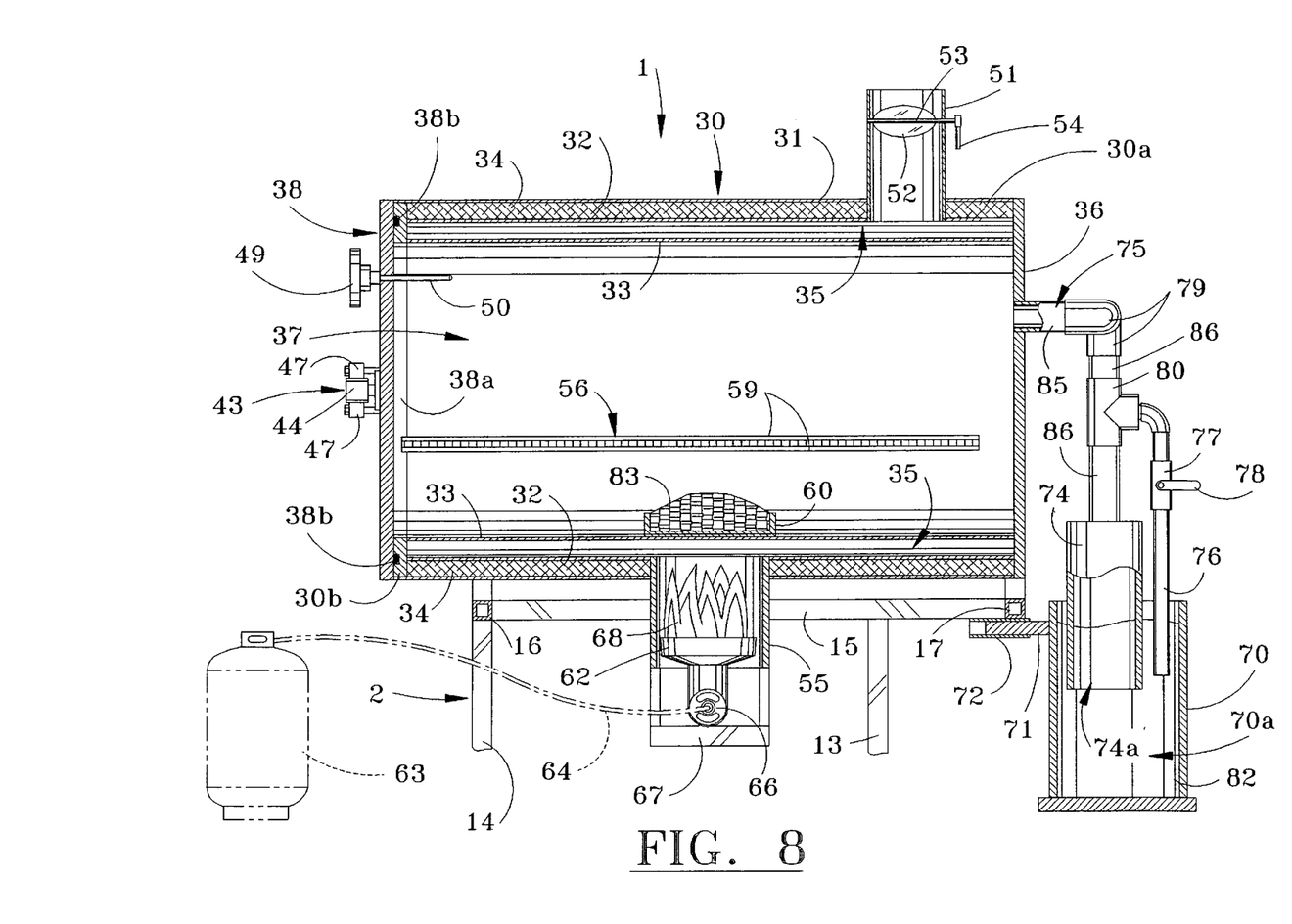
FIG. 8 is a longitudinal sectional view of the cooker tank and water container components of the convection meat cooker, mounted on the cooker frame (partially in section).

Referring again to FIGS. 1–3 and 5 and to FIGS. 4 and 6–8 of the drawings, the convection meat cooker 1 includes an elongated, substantially cylindrical cooker tank 30, horizontally supported on the front tank support bar 16 and the rear tank support bar 17 of the cooker frame 2, between the frame handles 12, as illustrated in FIG. 3 and the cooker tank 30 is typically welded to the front tank support bar 16 and rear tank support bar 17. As illustrated in FIG. 8, the cooker tank 30 is characterized by an elongated, cylindrical outer shell 31, typically constructed from steel, a steel middle shell 32 provided inside the outer shell 31, and an inner shell 33, also typically constructed of steel and provided inside the middle shell 32, which middle shell 32 and inner shell 33 are similar in construction to the outer shell 31 and disposed in spaced-apart, substantially concentric relationship with respect to each other and the outer shell 31. An elongated cooking chamber 37 is defined inside the inner shell 33 of the cooking tank 30, for receiving food such as meat, (not illustrated) to be roasted, broiled, smoked or barbecued in operation of the convection meat cooker 1, as hereinafter described. A substantially cylindrical, annular heat chamber 35 is defined between the middle shell 32 and inner shell 33 throughout the length of the cooker tank 30 and in surrounding relationship to the cooking chamber 37, for heating the cooking chamber 37 by convection during operation of the convection meat cooker 1 as hereinafter further described. Insulation 34, typically constructed from ceramic fibers or the like, is provided between the outer shell 31 and the middle shell 32, to partially thermally insulate the outer shell 31 of the cooker tank 30 from the annular heat chamber 35.

Figure 4:
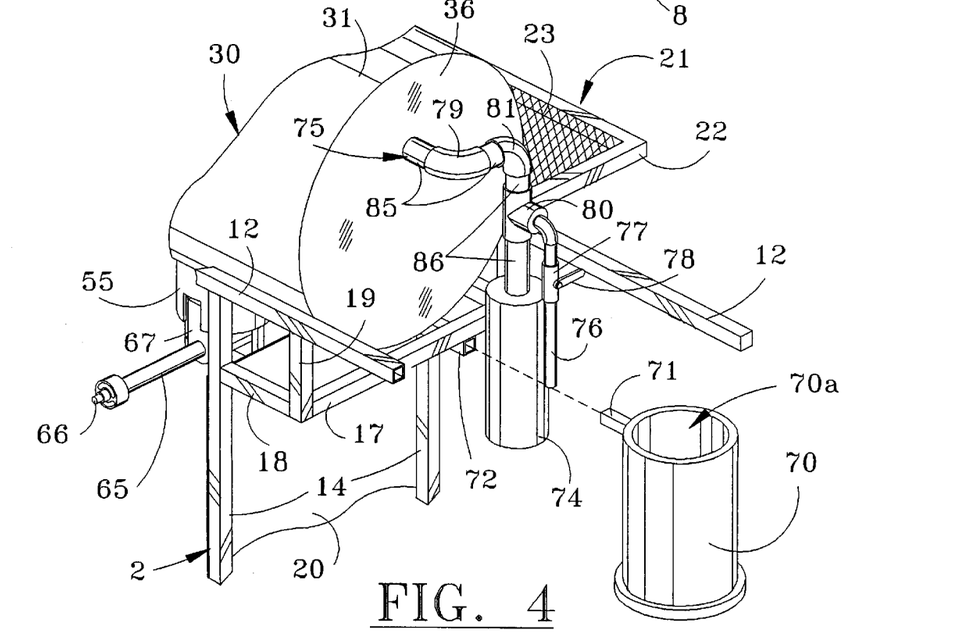
FIG. 4 is a rear perspective view, partially in section, of the cooker tank and cooker frame components of the convection meat cooker illustrated in FIG. 3, more particularly detailing a preferred technique for removably mounting the water container component on the cooker frame.

As further illustrated in FIG. 8, a heat exit port 51, provided in communication with the annular heat chamber 35, extends from the middle shell 32 and through the insulation 34 and outer shell 31 at the top of the cooker tank 30 for venting excess heat from the annular heat chamber 35, as hereinafter described. A heat entrance port 55, also provided in communication with the annular heat chamber 35, similarly extends from the middle shell 32 at the bottom of the cooker tank 30 and receives a standard or conventional, typically propane or butane-fueled burner 62 for heating the annular heat chamber 35. The burner 62 is supported in the heat entrance port 55 by means of a burner support bracket 67 and is typically fueled from a butane or propane fuel tank 63 (illustrated in phantom), through a fuel line 64 (also illustrated in phantom) and fuel line connecting nipple 66, provided in fluid communication with the burner 62 through a fuel line connecting pipe 65, as illustrated in FIGS. 3 and 4. A wood holder bracket 60 is typically provided on the inner shell 33 inside the cooking chamber 37, immediately above the heat entrance port 55 for containing charcoal (not illustrated) or wood chips 83, as desired to provide a smoked flavor to the food contained inside the cooking chamber 37 as the burner 62 is operated to heat the annular heat chamber 35.

Referring now to FIGS. 2 and 8, a meat rack rail 59 is provided on each side of the inner shell 33 of the cooker tank 30, inside the cooking chamber 37 for slidably receiving a meat rack 56. The meat rack 56 is typically characterized by a rectangular meat rack frame 57, spanned by a meat rack mesh 58 for supporting the meat or other food to be cooked in the cooking chamber 37. A circular back plate 36 is typically welded to the outer shell 31, middle shell 32 and inner shell 33 at the rear end 30a of the cooker tank 30 and as illustrated in FIGS. 1–3 and 5–8, a tank door 38 is connected by means of a tank door hinge 39 to the outer shell 31 of the cooker tank 30, for selectively sealing the cooking chamber 37 of the cooker tank 30. The tank door hinge 39 may be conventional and as illustrated in FIGS. 1–3, typically includes a generally U-shaped hinge bracket 41, typically bolted or welded to the outer shell 31 of the cooker tank 30 and a pair of hinge arms 40, typically bolted or welded to the tank door 38. A hinge pin 42 extends through registering pin openings (not illustrated) provided in the hinge arms 40 and hinge bracket 41 of the tank door hinge 39, to pivotally secure the tank door 38 to the cooker tank 30. As illustrated in FIG. 8, an annular seal plate 38a is typically welded to the outer shell 31, the middle shell 32 and the inner shell 33 at the front end 30b of the cooker tank 30. An annular, typically high temperature rubber door seal 38b is provided on the inside surface of the tank door 38, adjacent to the edge thereof and when the tank door 38 is closed and latched as hereinafter further described, the annular door seal 38b is pressed against in a groove (not illustrated), in the seal plate 38a to seal the cooking chamber 37 and prevent escape of hot air from the heated cooking chamber 37. As illustrated in FIGS. 5–7, a door latch 43, which may be conventional in design, is provided on the tank door 38 and includes a latch mount bracket 45, typically bolted to the outside of the tank door 38 and an elongated latch handle 44 is pivoted to the latch mount bracket 45 by means of a pivot pin (not illustrated) which extends through registering pin openings (not illustrated) provided in the latch mount bracket 45 and the latch handle 44, respectively. A latch bar pin 47 is rotatably mounted in the latch handle 44 and a substantially U-shaped latch bar 46 is typically bolted to the latch bar pin 47, for removably engaging a latch bar block 48, provided on the outer shell 31 of the cooker tank 30 and latching the closed tank door 38 against the seal plate 38a in the cooker tank 30. Accordingly, the tank door 38 may be latched against the seal plate 38a and the door seal 38b of the cooker tank 30 to seal the interior cooking chamber 37, by initially pivoting the latch handle 44 away from the tank door 38 as illustrated in FIG. 7, and then extending the latch bar 46 around the latch bar block 48 and pivoting the latch handle 44 against the tank door 38, as illustrated in FIGS. 5 and 6. This action slightly displaces the latch bar pin 47 in the direction away from the latch bar block 48 to tighten the latch bar 46 against the latch bar block 48. The tank door 38 may be unlatched to facilitate opening the interior cooking chamber 37, by pivoting the latch handle 44 away from the tank door 38, thereby loosening the latch bar 46 on the latch bar block 48, and then removing the latch bar 46 from the latch bar block 48. As illustrated in FIGS. 1 and 2, a temperature gauge 49 typically includes a gauge shaft 50, which extends through the tank door 38 and into the cooking chamber 37, for measuring and indicating the temperature of the cooking chamber 37 on the temperature gauge 49.

In operation of the convection meat cooker 1, the burner 62, located in the heat entrance port 55, is operated to heat air contained in the annular heat chamber 35 and the heating, expanding air circulates throughout the annular heat chamber 35, around the cooking chamber 37. As a result, the cooking chamber 37 of the cooker tank 30 is uniformly heated by convection from the annular heat chamber 35 and excess heat is vented from the annular heat chamber 35, through the heat exit port 51. As illustrated in FIG. 8, a damper 52 may be provided on a damper rod 53 which spans the interior of the heat exit port 51 and terminates in an exterior damper handle 54, for varying the position of the damper 52 inside the heat exit port 51 and regulating the quantity of heat vented from the heat chamber 35, as desired.

Referring again to FIGS. 3, 4 and 8 of the drawings, in a preferred embodiment of the convection meat cooker 1, pressure vent piping 75 extends from fluid communication with the cooking chamber 37, through the back plate 36 of the cooker tank 30 and terminates outside the cooker tank 30 in a cylindrical pressure vent 74 having a bottom vent opening 74a, as illustrated in FIG. 8. As illustrated in FIG. 4, the pressure vent piping 75 typically includes a pair of horizontal pipe segments 85, connected by a first elbow joint 79, and a pair of vertical pipe segments 86, connected by a T-joint 80 and connected to the joined horizontal pipe segments 85 by a second elbow joint 81, with the vertical pressure vent 74 terminating the bottom vertical pipe segment 86 of the pressure vent piping 75. The pressure vent 74 is inserted in the open container interior 70a of a typically cylindrical water container 70 as illustrated in FIG. 8, and the water container 70 is typically removably attached to the cooker frame 2 as illustrated in FIG. 4, by inserting a container mount peg 71, provided on the water container 70, in a container peg receptacle 72 provided on the underside of the rear tank support bar 17 of the cooker frame 2. As illustrated in FIG. 8, the bottom vent opening 74a of the pressure vent 74 is submerged in water 82, provided in the container interior 70a. As further illustrated in FIGS. 3, 4 and 8, vertical pressure equilibration piping 76 is connected to the remaining arm of the T-joint 80, and typically terminates above the water 82 in the container interior 70a of the water container 70. The pressure equilibration piping 76 is provided with a pressure equilibration valve 77, having a valve handle 78, for reversibly opening the pressure equilibration valve 77 and equalizing pressure between the cooking chamber 37 and the atmospheric pressure, as desired, for purposes which will be hereinafter described.

Accordingly, in typical application of the convection meat cooker 1 as hereinafter further described, the pressure equilibration valve 77 is initially closed using the valve handle 78, to prevent flow of air into the cooking chamber 37. As the cooking chamber 37 is heated by convection from the annular heat chamber 35, with the meat (not illustrated) contained on the meat rack 56 in the cooking chamber 37, some of the heating, expanding air in the cooking chamber 37 is vented through the pressure vent piping 75 and pressure vent 74 and bubbles through the water 82 in the water container 70, to cause a negative pressure or partial vacuum relieve the pressure in the cooking chamber 37. After the cooked meat (not illustrated) has been removed from the cooking chamber 37 of the cooker tank 30, the burner 62 turned off and the tank door 38 re-sealed by operation of the door latch 43, a partial vacuum is again created in the cooking chamber 37 as the hot air inside the cooking chamber 37 cools and the water condenses, since the cooking chamber 37 is hermetically sealed by the closed and latched tank door 38. Because of the reduced pressure inside the cooking chamber 37, this partial vacuum draws moisture from the water 82 in the water container 70, through the pressure vent 74 and pressure vent piping 75 and into the still hot cooking chamber 37, where the moisture turns to steam and then cools and condenses in the interior of the cooking chamber 37. The moistened surfaces inside the cooking chamber 37 such as the inner shell 33 interior and the meat rack 56 render those surfaces easy to clean using a wipe rag or paper towels. Under circumstances where it is not desirable to utilize the moisturizing and cooling function of the water container 70, pressure vent 74 and pressure vent piping 75, the cooling and contracting air inside the cooking chamber 37 can be equilibrated with the atmospheric pressure outside the cooker tank 30 by opening the pressure equilibration valve 77 using the valve handle 78. This action causes air outside the cooker tank 30 to be drawn through the pressure vent piping 75 into the cooking chamber 37, and dissipates the partial vacuum inside the cooking chamber 37.

Referring again to FIGS. 2, 4 and 8 of the drawings, in typical cooking operation, the convection meat cooker 1 of this invention can be used to roast, broil, smoke or barbecue various types of meats including roast, ham, turkey and chicken, in non-exclusive particular, in a short period of time as compared to that required for conventional outdoor cookers or smokers. The vertical pressure vent 74, provided on the end of the pressure vent piping 75, is initially extended into the container interior 70a of the water container 70. The water container 70 is then attached to the cooker frame 2 by inserting the container mount peg 71 in the container peg receptacle 72, as illustrated in FIG. 4 and heretofore described. Water 82 is then poured into the container interior 70a of the water container 70 until the vent opening 74a in the bottom of the pressure vent 74 is submerged in the water 82, as illustrated in FIG. 8. The pressure equilibration valve 77 in the pressure equilibration piping 76 is closed, using the valve handle 78, to prevent flow of air from outside the cooker tank 30 into the cooking chamber 37. The tank door 38 is opened by operation of the door latch 43, as heretofore described with respect to FIGS. 5–7, and the meat rack 56 may be partially extended from the meat rack rails 59, as illustrated in FIG. 2. The meat (not illustrated) is then transferred from a pan or plate (not illustrated), typically resting on the support shelf 21 (extended from the cooker frame 2 as described above with respect to FIG. 1), and placed on the meat rack 56 and the meat rack 56 is pushed back into the cooking chamber 37 on the meat rack rails 59. When it is desired to smoke the meat in the cooking chamber 37, wood chips 83 are placed in the wood holder bracket 60. The interior cooking chamber 37 of the cooker tank 30 is then hermetically sealed by closing and latching the tank door 38 using the door latch 43, as heretofore described. The gas flow valve (not illustrated) of the burner fuel tank 63, which typically rests on the frame mesh 10 (FIG. 1) of the cooker frame 2, is then opened to allow flow of butane or propane gas from the burner fuel tank 63 through the fuel line 64 and fuel line connecting pipe 65 (FIG. 3) to the burner 62, mounted in the heat entrance port 55 of the cooker tank 2, on the burner support bracket 67. The burner 62 is ignited in conventional fashion, typically by inserting a burning match inside the heat entrance port 55. Because the burner flames 68 are in direct contact with the air contained in the annular heat chamber 35, the increasing kinetic energy of the heating air in the annular heat chamber 35 causes the expanding air to travel throughout the continuous annular heat chamber 35 and encircle the cooking chamber 37. Consequently, the cooking chamber 37 is heated to a substantially uniform temperature throughout by convection from the annular heat chamber 35, with minimal loss of heat from the cooking chamber 37, since the cooking chamber 37 is hermetically sealed by the latched tank door 38 at the seal plate 38a. Some of the heating, expanding air in the cooking chamber 37 escapes through the pressure vent piping 75, pressure vent 74 and water 82 in the water container 70, as heretofore described, to relieve pressure inside expel air from the cooking chamber 37 without enabling air outside the cooker tank 30 to enter the cooking chamber 37. The temperature in the cooking chamber 37 continues to rise by continued operation of the burner 62 and convection of heat to the cooking chamber 37 from the surrounding annular heat chamber 35. Excess heat in the annular heat chamber 35 is vented through the heat exit port 51, and the burner flame 68 can be adjusted using the gas flow valve (not illustrated) on the fuel tank 63 until a desired heat inside the cooking chamber 37 is maintained, as indicated on the temperature gauge 49. Accordingly, the meat inside the cooking chamber 37 cooks quickly and thoroughly, minimizing loss of natural moisture from the meat and retaining tenderness under partial vacuum conditions. In that embodiment of the convection meat cooker 1 which includes the damper 52 in the heat exit port 51 as illustrated in FIG. 8 and heretofore described, the quantity of heat vented from the annular heat chamber 35 may be regulated by adjusting the position of the damper 52 in the heat exit port 51 using the damper handle 54. Under circumstances in which the wood chips 83 are placed in the wood holder bracket 60, the wood chips 83 smolder due to application of the burner flames 68 to the overlying wood holder bracket 60, and smoke from the smoldering wood chips 83 fills the cooking chamber 37 and smokes the meat.

Typical vacuum cooking conditions at various temperatures are indicated on the chart below:

| TEMP.(°F.) | DURATION (MIN.) | VACUUM (inches of water) |
| --- | --- | --- |
| 200 | 20 | 0.25 |
| 250 | 20 | 1.00 |
| 300 | 20 | 3.25 |
| 350 | 20 | 3.25 |
| 400 | 20 | 4.00 |
| 425 | 20 | 4.00 |
| 450 | 20 | 4.00 |

After heat is removed from the convection meat cooker 1, the vacuum in the cooking chamber 37 increased to 5 inches of water and water is drawn into the cooking chamber 37 from the water container 70.

The temperature of the cooking chamber 37 may be monitored by visual indication on the temperature gauge 49 (FIG. 1), and adjusted by varying the size of the burner flames 68 by regulating the gas flow valve (not illustrated) on the fuel tank 63 or by adjusting the position of the damper 52 in the heat exit port 51, as heretofore described. After the meat has sufficiently cooked in the cooking chamber 37 as determined typically by the temperature of the cooking chamber 37, indicated on the temperature gauge 49 and the cooking time, the burner 68 is turned off, the tank door 38 opened by operation of the door latch 43, the meat removed from the cooking chamber 37 and the tank door 38 again closed and sealed by the door latch 43. The interior of the cooking chamber 37 can then be moisturized and cooled, as desired, by maintaining the pressure equilibration valve 77 in the closed position. Accordingly, as described above, the cooling, contracting air inside the cooking chamber 37 creates a partial vacuum and the resulting reduced air pressure in the cooking chamber 37 draws moisture from the water 82 in the water container 70, through the pressure vent 74 and pressure vent piping 75 and into the cooking chamber 37. The resulting moisture in the cooking chamber 37 vaporizes as steam and then cools and condenses on the interior surface of the inner shell 33 of the cooker tank 30, the tank door 38 and the meat rack 56, rendering these surfaces easy to wipe and clean, as desired, after use of the convection meat cooker 1. Under circumstances in which moisturization of the cooking chamber 37 is not desired, reduced or vacuum negative pressure in the cooking chamber 37 can be equilibrated with the atmospheric pressure outside the cooker tank 30 to prevent moisture from entering the cooking chamber 37 from the water container 70. This is accomplished by opening the pressure equilibration valve 77 by operation of the valve handle 78, thereby causing air outside the cooker tank 30 to be drawn through the pressure equilibration piping 76 and pressure vent piping 75 and into the cooking chamber 37 and dissipating the partial vacuum in the cooking chamber 37.

It will be appreciated by those skilled in the art that the convection meat cooker 1 of this invention can be used to roast, broil, smoke or barbecue a variety of meats including but not limited to turkey, ham, roast and chicken. Furthermore, since the entire cooking chamber 37 is substantially uniformly heated by convection from the surrounding annular heat chamber 35 during operation of the burner 62 as heretofore described, any number of meats which space permits to be placed on the meat rack 56 can be simultaneously roasted, broiled, smoked or barbecued in the cooking chamber 37, in substantially the same amount of time as that which would be required to cook one of the meats alone. It has surprisingly been found that the time required to complete the roasting, broiling, smoking or barbecuing process, when performed using the convection meat cooker 1 of this invention, can be reduced by as much as 80% to 90%, as compared to the time required for conventional outdoor smokers or cookers. Moreover, the automatic moisturizing process facilitated by the water container 70, pressure vent 74 and pressure vent piping 75 enables cleansing of the cooking chamber 37 interior using rags or paper towels, as heretofore described, after use of the convection cooker 1, without the need for applying water or cleansing solution to the cooking chamber interior 37.

It will be further appreciated by those skilled in the art that the cooker tank 30 and burner fuel tank 63 (supported on the frame mesh 10 of the cooker frame 2) can be transported on the cooker frame 2, as desired, by grasping and raising the frame handles 12 of the cooker frame 2 to lift the frame feet 8 from the supporting surface (not illustrated), and transporting the cooker frame 2 on the wheels 9 by pushing or pulling on the handles 12 as heretofore described.

While the preferred embodiments of the invention have been described above, it will be recognized and understood that various other modifications may be made in the invention and the appended claims are intended to cover all such modifications which may fall within the spirit and scope of the invention.

Having described my invention with the particularity set forth above, what is claimed is:

1. A convection cooker comprising a cooker tank having an air-sealable cooking chamber for receiving food, a burner operably engaging said cooker tank for heating said cooking chamber and a water container provided in fluid communication with said cooking chamber for containing water, whereby heating, expanding air is drawn from said cooking chamber and vented through said water container responsive to operation of said burner for inducing a first partial vacuum in said cooking chamber and cooling, contracting air in said cooking chamber forms a second partial vacuum in said cooking chamber which draws moisture from said water container into said cooking chamber, responsive to terminating operation of said burner.

2. The convection cooker of claim 1 wherein said cooker tank comprises an outer shell, an inner shell provided in said outer shell and defining said cooking chamber inside said inner shell, and a heat chamber defined between said inner shell and said outer shell.

3. The convection cooker of claim 1 comprising a cooker frame and wherein said cooker tank is provided on said cooker frame.

4. The convection cooker of claim 1 wherein said cooker tank comprises an outer shell, an inner shell provided in said outer shell and defining said cooking chamber inside said inner shell, and a heat chamber defined between said inner shell and said outer shell and comprising a cooker frame and wherein said cooker tank is provided on said cooker frame.

5. The convection cooker of claim 1 comprising a heat entrance port provided on said cooker tank and adjacent to said cooking chamber, and wherein said burner is provided in said heat entrance port.

6. The convection cooker of claim 5 wherein said cooker tank comprises an outer shell, an inner shell provided in said outer shell and defining said cooking chamber inside said inner shell, and a heat chamber defined between said inner shell and said outer shell.

7. The convection cooker of claim 5 comprising a cooker frame and wherein said cooker tank is provided on said cooker frame.

8. The convection cooker of claim 5 wherein said cooker tank comprises an outer shell, an inner shell provided in said outer shell and defining said cooking chamber inside said inner shell, and a heat chamber defined between said inner shell and said outer shell and comprising a cooker frame and wherein said cooker tank is provided on said cooker frame.

9. The convection cooker of claim 2 wherein said cooker tank comprises a middle shell between said outer shell and said inner shell, and comprising insulation between said outer shell and said middle shell of said cooker tank.

10. The convection cooker of claim 9 comprising a cooker frame and wherein said cooker tank is provided on said cooker frame.

11. The convection cooker of claim 9 comprising a heat entrance port provided on said cooker tank and adjacent to said cooking chamber, and wherein said burner is provided in said heat entrance port.

12. The convection cooker of claim 9 comprising a cooker frame and wherein said cooker tank is provided on said cooker frame and comprising a heat entrance port provided on said cooker tank and adjacent to said cooking chamber, and wherein said burner is provided in said heat entrance port.

13. A convection cooker comprising a cooker tank, said cooker tank comprising a substantially cylindrical outer shell; a substantially cylindrical inner shell provided in said outer shell; an annular heat chamber defined between said outer shell and said inner shell; an air-sealable cooking chamber provided in said inner shell for receiving food and a burner operably engaging said cooker tank for heating said annular heat chamber, whereby said cooking chamber is heated by convection from said annular heat chamber responsive to operation of said burner.

14. The convection cooker of claim 13 comprising a cooker frame and wherein said cooker tank is provided on said cooker frame.

15. The convection cooker of claim 13 wherein said cooker tank comprises a middle shell between said outer shell and said inner shell, and comprising insulation between said outer shell and said middle shell of said cooker tank.

16. The convection cooker of claim 13 comprising a cooker frame and wherein said cooker tank is provided on said cooker frame and wherein said cooker tank comprises a middle shell between said outer shell and said inner shell, and comprising insulation between said outer shell and said middle shell of said cooker tank.

17. The convection cooker of claim 13 comprising a water container provided in fluid communication with said cooking chamber for containing water, whereby heating, expanding air is drawn from said cooking chamber and vented through said water container responsive to operation of said burner, for inducing a first partial vacuum in said cooking chamber and cooling, contracting air in said cooking chamber forms a second partial vacuum in said cooking chamber which draws moisture from said water container into said cooking chamber, responsive to terminating operation of said burner.

18. The convection cooker of claim 17 wherein said cooker tank comprises a middle shell between said outer shell and said inner shell, and comprising insulation between said outer shell and said middle shell of said cooker tank.

19. The convection cooker of claim 18 comprising a cooker frame and wherein said cooker tank is provided on said cooker frame.

20. The convection cooker of claim 13 comprising a heat entrance port provided on said cooker tank in communication with said annular heat chamber, and wherein said burner is provided in said heat entrance port.

21. The convection cooker of claim 20 wherein said cooker tank comprises a middle shell between said outer shell and said inner shell, and comprising insulation between said outer shell and said middle shell of said cooker tank.

22. The convection cooker of claim 21 comprising a water container provided in fluid communication with said cooking chamber for containing water, whereby heating, expanding air is drawn from said cooking chamber and vented through said water container responsive to operation of said burner for inducing a first partial vacuum in said cooking chamber and cooling, contracting air in said cooking chamber forms a second partial vacuum in said cooking chamber which draws moisture from said water container into said cooking chamber, responsive to terminating operation of said burner.

23. The convection cooker of claim 22 comprising a cooker frame and wherein said cooker tank is provided on said cooker frame.

24. A convection cooker comprising a cooker tank, said cooker tank comprising a substantially cylindrical outer shell; a substantially cylindrical middle shell provided in said outer shell and insulation provided between said outer shell and said middle shell; an inner shell provided in said middle shell, an air-tight cooking chamber provided in said inner shell and an annular heat chamber defined between said middle shell and said inner shell; a heat entrance port provided in communication with said annular heat chamber and a burner provided in said heat entrance port for heating said annular heat chamber and forming a first partial vacuum in said cooking chamber, whereby said cooking chamber is heated by convection from said annular heat chamber responsive to operation of said burner; a heat exit port provided in communication with said annular heat chamber for venting hot air from said annular heat chamber; pressure vent piping provided in fluid communication with said cooking chamber and a pressure vent terminating said pressure vent piping; a water container engaging said cooker tank for containing water, said pressure vent submerged in said water, whereby heated air is drawn from said cooking chamber and vented through said pressure vent piping and said pressure vent through said water container responsive to operation of said burner, for inducing said first vacuum and cooling, condensing air in said cooking chamber creates a second partial vacuum in said cooking chamber which draws moisture from said water container through said pressure vent and said pressure vent piping and into said cooking chamber, responsive to terminating operation of said burner; and a pressure equilibration valve provided in fluid communication with said pressure vent piping for selectively depressurizing said cooking chamber.

25. The convection cooker of claim 24 comprising a damper provided in said heat exit port for controlling flow of said hot air from said annular heat chamber.

26. The convection cooker of claim 25 comprising a cooker frame and wherein said cooker tank is provided on said cooker frame.

27. The convection cooker of claim 24 comprising a wood holder bracket provided in said cooking chamber.

28. The convection cooker of claim 27 comprising a damper provided in said heat exit port for controlling flow of said hot air from said annular heat chamber.

29. The convection cooker of claim 28 comprising a cooker frame and wherein said cooker tank is provided on said cooker frame.

\* \* \* \* \*